United States Patent [19]

Hellman

[11] 4,180,998
[45] Jan. 1, 1980

[54] BICYCLE LOCK

[75] Inventor: Erkki Hellman, Rymattyla, Finland

[73] Assignee: Oy Wartsila AB, Helsinki, Finland

[21] Appl. No.: 892,184

[22] Filed: Mar. 31, 1978

[51] Int. Cl.$^2$ .............................................. B62H 5/14
[52] U.S. Cl. ......................................... 70/227; 70/233
[58] Field of Search .............. 70/227, 226, 233, 236; 292/259, 114

[56] References Cited

U.S. PATENT DOCUMENTS

| | | | |
|---|---|---|---|
| 1,288,487 | 12/1918 | Bohan | 292/202 |
| 1,514,318 | 11/1924 | Henriksson | 70/143 |
| 2,099,606 | 11/1937 | Holsen | 70/227 |
| 2,532,864 | 12/1950 | Theodorackis | 70/227 |
| 2,683,049 | 7/1954 | van der Spek | 292/238 |
| 2,691,289 | 10/1954 | Wollaston | 70/227 |

*Primary Examiner*—Kenneth Dorner
*Attorney, Agent, or Firm*—J. Harold Nissen

[57] ABSTRACT

A locking device for a bicycle or a corresponding lockable unit, which comprises a locking member swingable from a releasing position through a wheel of the lockable unit to a locking position and vice versa. A catch is provided to receive the free end of the locking member and a cylinder lock is attached to the other end of the locking member; and, in order to move the free end of the locking member into the catch and to remove it therefrom, the locking member has to be turned around a longitudinal axis. The swinging movement of the locking member between its locking and releasing positions is dependent on the turning position of the locking member so that the swinging movement can be carried out only when the locking member is in a certain turning position.

15 Claims, 5 Drawing Figures

BICYCLE LOCK

BACKGROUND OF THE INVENTION

This invention relates to a locking device for a lockable unit, such as a bicycle or the like.

More particularly, the invention is concerned with a lock arrangement for the lockable unit. The lock arrangement comprises a locking member swingable from a releasing position through a wheel of the unit to a locking position and vice versa, a catch to receive the free end of the locking member and a cylinder lock attached to the other end of the locking member. In order to remove the locking member from the catch or to insert it thereinto, the locking member has to be turned around a longitudinal axis.

In this specification and in the claims the expression "lockable unit" means any device provided with a pin wheel or generally a wheel having suitable openings for a locking member to be put through in order to lock the wheel so that it cannot be rotated. Examples of lockable units are a bicycle, a motor cycle, carriages etc. Also, stationary units with rotatable wheels or the like may constitute suitable lockable units in which the invention advantageously can be applied.

In a lock according to the invention, the locking member performs two different movements around two different turning axes. To distinguish these two different movements from each other they are differently named in the specification and in the claims so that "swing" or "swinging" or some form thereof consistently means a movement of the locking member in a plane basically or substantially perpendicular to the plane of the lockable wheel, whereas "turning" or "turn" or some form thereof means a movement around a longitudinal axis of the locking member.

In the known locks having a locking member which is swung through a lockable wheel into a locking position and from this position back into a releasing position, the main difficulties arise when it is desired to attach the free end of the locking member sufficiently firmly to the catch and to make sure that the locking member stays in its releasing position when the lock has to stay open.

Different solutions have been suggested, but at least to some extent, they all are relatively complicated and expensive or unreliable.

An object of the invention is to create a novel lock arrangement which is simpler to operate when compared with the known locks, while at the same time its operation and its construction is very reliable.

Another object is to provide that the key of the lock is removable from the lock only when the lock arrangement is in its locking position.

Still another object is to secure the locking and the releasing positions of the locking member so as to prevent unintentional movements of the locking member.

The characteristic feature of the invention is that the swinging movement of the locking member is dependent on the turning position of the locking member so that the swinging movement can be carried out only when the locking member is in a certain turning position. In a lock of this type, the turning movement of the locking member can easily be made use of to obtain a very reliable and secure attachment between the catch and the locking member. Also, at the same time, it is possible to lock the locking member when in its releasing position so that it can have a swinging movement imparted thereto only after unlocking. In the lock arrangement according to the invention, swinging movement of the locking member between its locking and releasing positions takes part around a pivot which preferably is in the form of a stub shaft or equivalent. The stub shaft can be located so close to the locking member or a member attached thereto, that a recess or recesses in the locking member or the member attached thereto and in the stub shaft determines in which turning position the locking member is swingable and/or in which swinging position the locking member is turnable. By this means, the desired dependence and relationship between the swinging and the turning movements of the locking member is obtained in a simple way. At the same time, the recess in the stub shaft can be easily arranged so that the locking member or member attached thereto, at least in the locking position of the arrangement, serves as a member to keep the swingable body of the arrangement axially secured to its pivot.

The locking member can be provided with a suitable spring load which influences its turning movement. Therefore, the locking member when in its locking position advantageously tends to move into a position wherein the swinging of the locking member from its locking position is prevented. This contributes to keeping the locking member securely in its locking position. The same spring load can also be used to lock the locking member in its releasing position.

In accordance with a feature of the invention, a cylinder lock is provided such that the key of the lock is removable only in a certain zero position. Then, the members of the lock arrangement can be easily so guided that the zero position of the cylinder lock is obtainable only when the locking member is in its locking position. Accordingly, the ability to remove the key from the lock verifies that the lock arrangement is really locked. Some known cylinder locks are very suitable for the purpose, especially those where the tumblers or the locking discs of the lock are arranged to take a position releasing the locking mechanism and simultaneously making the key non-removable from the lock only upon turning of the key from its insertion and removal position. Such a lock mechanism is shown, for example, in U.S. Pat. No. 1,514,318 and which is hereby incorporated by reference. This type of lock is not damaged even if it is kept for a long period of time in a position in which the key cannot be removed. However, this is not the case with locks having spring loaded tumblers, because the strength of the springs little by little fades away if the key remains in the lock for a long time. In addition, it is important from the viewpoint of security that the key automatically stays in the lock.

The cylinder lock, which includes tumblers or locking discs, and the locking member of a lock arrangement according to the invention can advantageously be directly connected to each other. Also, the locking member can be guided so that when it is in its releasing position, it is prevented from turning into a position allowing the key to be removed. By this means, removal of the key is prevented in a simple way when the lock arrangement is not in its locking position. The tumblers are arranged to take a position releasing the locking mechanism of the cylinder lock only after turning the key of the lock from its insertion and removal position as disclosed in the above-noted U.S. Pat. No. 1,514,318.

If the locking member is loaded with a spring urging it when it is in its releasing or release position to turn into a position in which it is prevented, from swinging towards its locking position the advantage is obtained that the locking member is automatically locked in its releasing position and there is no danger that it could swing by accident between the pins or the like of the lockable wheel when this is not desired. For this purpose, stop surfaces are provided in the swing mechanism to prevent the locking member from accidentally swinging through the wheel when the locking member is in its release or releasing position. The locking of the locking member in its releasing position is a very important security point because an unintentional locking of a bicycle lock while the wheel is rotating could cause serious accidents.

Other objects, advantages and the nature of the invention will become readily apparent from the detailed description of the invention taken in conjunction with the accompanying drawings.

DESCRIPTION OF THE PREFERRED EMBODIMENT

Figure 1:
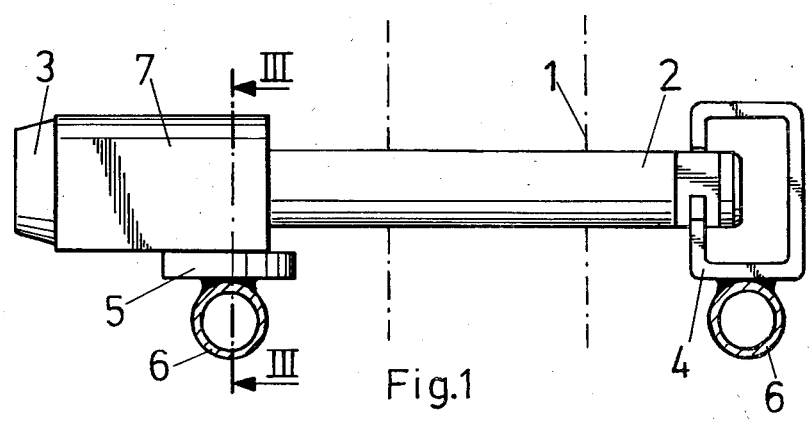
FIG. 1 shows a plan view of a lock arrangement according to the invention as seen from the bottom thereof. The lock arrangement is shown in its locking position with the locking member passing through a wheel of a bicycle or another lockable unit.

Referring now in detail to the drawings, a locking device or arrangement for a conventional wheel 1 of a bicycle, or a corresponding lockable unit showing a pair of frame tubes 6 is shown which includes a locking member 2 and a cylinder lock 3 associated therewith. Wheel 1 may be any movable member supported between a pair of stationary members, such as tubes 6.

The locking device also includes a catch 4 suitably permanently connected, such as by welding, to one frame tube 6 or other suitable member of the bicycle and a fastening member 5 also permanently connected to the other frame tube 6 or other suitable member of the bicycle and connected with locking member 2 for connection thereof to frame tube 6 and to cooperate with catch 4 on the opposite side of wheel 1.

Catch 4 and fastening member 5 form a fastening means for connection to the pair of stationary members. This fastening means is used when the locks are assembled in connection with the manufacturing of the bicycle or the like. If the lock arrangement is sold as a separate unit, members 4 and 5 are fastened to a U-shaped member which corresponds to frame tubes 6 and which is fastened to the body of the lockable unit in a suitable way.

Locking member 2 and cylinder lock 3 are connected together and to the one of the frame tubes 6 by means of a swingable body 7. Locking member 2 and cylinder lock 3 are received within swingable body 7 and swingable therewith as a unit. Cylinder lock 3 is provided with a removable key 8 to rotate the inner cylinder of the lock relative to swingable body 7. Swingable body 7 is connected to fastening member 5 by means of a stub shaft 9 which is fixed thereto, and the stub shaft includes a locking ring 14 for locking swingable body 7 and stub shaft 9 together while permitting pivoting or rotation of swingable body 7 together with locking member 2 and cylinder lock 3 about the stub shaft 9 and the central longitudinal axis thereof.

Figure 2:
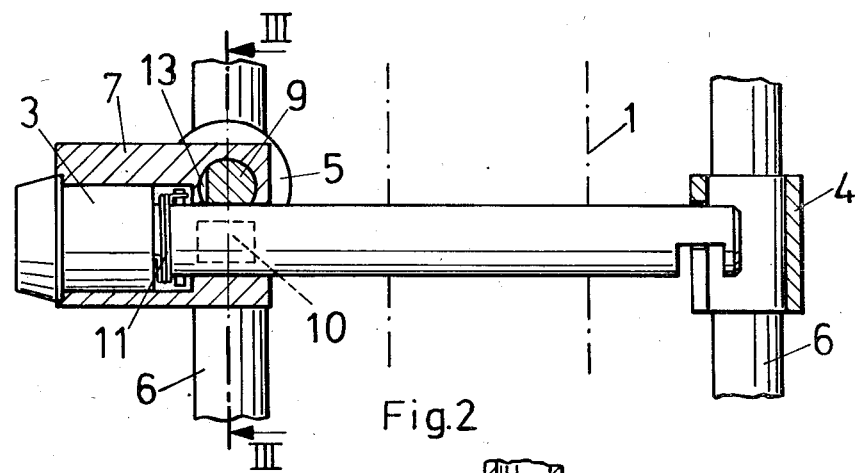
FIG. 2 is a side view, partially in section, of the lock arrangement shown in FIG. 1.

As viewed in FIG. 1, locking member 2 swings about the axis of stub shaft 9 in a plane which is perpendicular to the plane of the drawing sheet, and as viewed in FIG. 2, the same swinging movement of locking member 2 takes place in the plane of the drawing. Stub shaft 9 is provided with a recess 12 and swingable body 7 is provided with a bearing circumferential interior surface in conformity with the outer circumferential surface of the locking member 2. The interior circumferential surface in swingable body 7 and recess 12 in stub shaft 9 together provide for a bearing within which the locking member turns about its own axis, but prevents the locking member from being swung in a plane perpendicular to wheel 1.

As best seen in FIG. 1, a turning movement of locking member 2 first takes place about its own longitudinal axis to disengage the free end thereof from catch 4 and to make it possible to swing it away from catch 4 and disengage the locking member 2 and wheel 1 from each other. The turnable inner cylinder of cylinder lock 3 is fastened directly to locking member 2 so that key 8 (FIG. 4) directly controls the turning movement of locking member 2. In the releasing position, locking member 2 is in the vertical position as shown in FIG. 4 but turned 45 degrees from the FIGS. 1 to 3 position as will be explained, so that it cannot be swung back to the FIGS. 1, 2 and 3 position.

In order to permit locking member 2 to be swung relative to stub shaft 9, locking member 2 is provided with a recess 10. Locking member 2 can only be swung after it has been turned to bring the circumferential portion of locking member 2 containing recess 10 into position with and facing the circumferential portion of stub shaft 9. Only then can locking member 2 be swung about the axis of stub shaft 9 and in a plane perpendicular to the plane of wheel 1.

Figure 3:
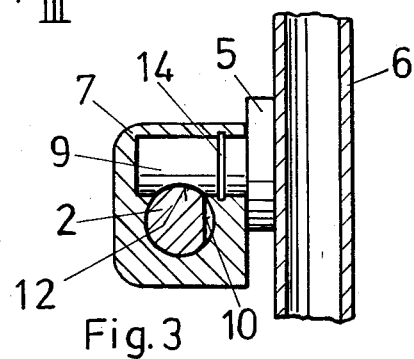
FIG. 3 is a sectional view taken on line III—III of FIG. 1 and FIG. 2.
Figure 4:
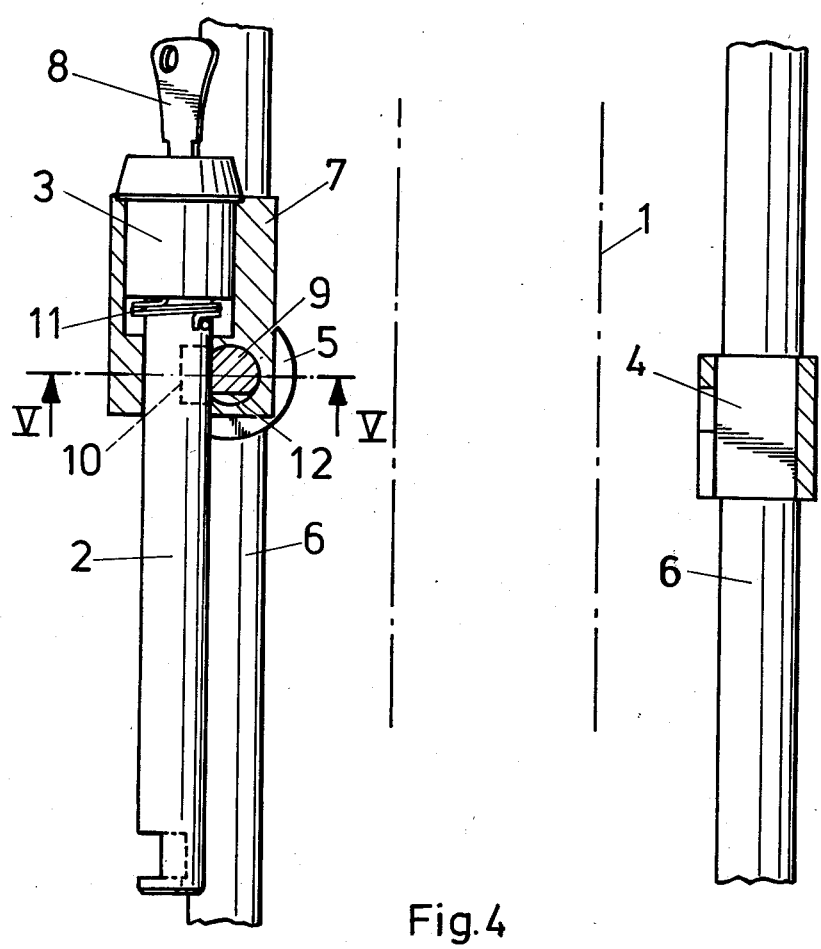
FIG. 4 is a partial sectional view of the lock arrangement, similar to the view shown in FIG. 2, but showing the lock arrangement in its releasing position; and, FIG. 5 is a sectional view taken on line V—V of FIG. 4.

Locking member 2 is loaded with a spring 11 so as to maintain it in the position shown in FIGS. 1, 2 and 3 or to urge it into that position when out of it, and only by means of key 8 is it possible to turn the inner cylinder of cylinder lock 3 to overcome the force of spring 11 and turn the locking member about its own axis to disengage the free end thereof from catch 4, and thereby permit the locking member to be swung out of engagement (or into engagement) with catch 4. Spring 11 has one end connected with locking member 2 at a portion thereof within swingable body 7 and another end connected with the housing of cylinder lock 3 rigidly fitted in swingable body 7. Locking member 2 under the urging of spring 11 always tends to turn about its own longitudinal axis in a direction towards the FIGS. 1 to 3 position.

Figure 5:
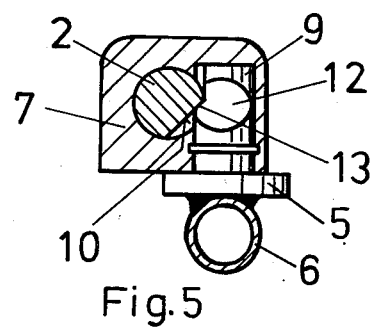

Stub shaft 9 is also provided with a stop surface 13, as best seen in FIGS. 2 and 5 which is displaced from recess 12 by an angle of 90 degrees. Stop surface 13 engages the base of recess 10 to maintain locking member 2 turned from its FIGS. 1 to 3 position by an angle of 45 degrees. The cylinder lock arrangement 3 is such that when the locking member is in its FIGS. 4 and 5 position, key 8 cannot be removed from the cylinder lock 3.

In the operation of the locking device, key 8 is inserted into cylinder lock 3 to operate it so as to turn the locking member about its own axis to free it from catch 4. Consequently, the key 8 is used to overcome the force of spring 11 and to turn the locking member 2 directly by means of the cylinder lock mechanism 3. Recess 10 on the locking member 2 and recess 12 on the stub shaft then permit swinging movement of locking member 2 about the axis of stub shaft 9.

Body 7 of the lock arrangement then swings round stub shaft 9 which is included in and held by the fastening member 5 of the arrangement. Stub shaft 9 and locking member 2 are located so close to each other that the swinging movement can be accomplished only when the locking member is turned into such a position that recess 10 in it faces towards stub shaft 9. Hence, the locking member is prevented from swinging into the releasing position even when the catch 4 is sawn away or is broken to pieces. In locking position of the arrangement, body 7 cannot be removed from stub shaft 9 even by breaking locking ring 14, because locking member 2 also serves as a fastening means for body 7, as can be seen from FIG. 3.

Loading of the locking member 2 by spring 11 causes an influence on the turning movement of the locking member urging it into the turning position shown in FIGS. 1, 2 and 3. In this position, the swinging movement of the locking member is locked due to the fact that recess 10 does not face stub shaft 9. On the other hand, the locking member can take the turning position shown in FIGS. 1, 2 and 3 only in its locking position when it has entered into catch 4, because stub shaft 9 is provided with recess 12 which permits the locking member to be able to turn about its own axis.

In the releasing position of locking member 2, under the urging of spring 11, locking member 2 tends to turn into the turning position shown in FIGS. 1, 2 and 3. But as can be seen from FIG. 5, this is prevented by means of stop surface 13 in the stub shaft. This stop surface becomes engaged with and operates jointly with the bottom surface of recess 10 in the locking member so that the locking member stays in a turning position of about 45 degrees measured from the position shown in FIGS. 1, 2 and 3, in which key 8 of cylinder lock 3 can be inserted into the cylinder lock or removed therefrom. Thus, because in its releasing position the locking member cannot take the last mentioned turning position, key 8 of the cylinder lock cannot be removed from the lock but it remains in the lock. At the same time the swinging movement of locking member 2 is locked, because recess 10 is not sufficiently turned towards stub shaft 9 to allow the locking member to be swung. For swinging locking member 2, it must be turned about 45 degrees in the counter-clockwise direction (viewed from its free end) from its FIGS. 4 and 5 position.

While there has been shown what is considered to be the preferred embodiment of the invention and the best mode thereof, it will be evident to those skilled in the art that various changes and modifications may be made therein without departing from the scope of the invention as defined by the attached claims.

I claim:

1. A locking device for a lockable unit having a rotatable wheel positioned between a pair of stationary members, comprising
   a locking member swingable from a releasing position through the wheel to a locking position and vice-versa,
   a locking mechanism connected to said locking member and having an element which turns about a first axis,
   means connecting said locking member with one of said stationary members for movement relative thereto and with said other stationary member under the control of said locking mechanism, and
   means for turning said locking member about said first axis which is a longitudinal axis thereof for freeing said locking member from engagement with said other stationary member, said connecting means providing means for swinging said locking member about a second axis transverse to said first axis solely after said locking member has been turned about said first axis from a first position preventing swinging movement thereof to a second position thereof permitting swinging movement of said locking member about said second axis.

2. A locking device as claimed in claim 1, wherein said connecting means includes:
   a fastening member connected with said one of said stationary members and a catch connected with the other of said stationary members, and
   a swingable body and a stub shaft connecting said swingable body with said fastening member, said locking member having one end held by said swingable body for swinging movement therewith; and,
   said locking mechanism includes:
   a cylinder lock attached to said one end for controlling the turning of said locking member about said first axis, and
   said locking member having another end forming a free end in a first position for engagement with said catch in said locking position and being turnable about said first axis to a second position for release from said catch for swinging movement away from said catch and away from said position through the wheel.

3. A locking device as claimed in claim 2, wherein said locking mechanism includes a spring having one end fixed with respect to said swingable body and another end connected with said locking member for urging said locking member into said first position thereof; and
   a key operatively associated with said cylinder lock for operating said cylinder lock to turn said locking member about said first axis.

4. A locking device as claimed in claim 3, wherein said stub shaft has a first recess which permits said locking member to be turned about said first axis to said second position, and
   said locking member has on a circumferential portion thereof a second recess which, after turning of said locking member from said first position to said second position is brought to face said first recess and thereby permit said locking member to be swung about said second axis.

5. A locking device as claimed in claim 4, wherein said stub shaft includes a stop surface which cooperates with and engages said second recess on said locking member to prevent said locking member from turning about said first axis to said first position, and
   said cylinder lock holds said key thereto when said second recess on said locking member is engaged with said stop surface and is prevented from turning about said first axis to said first position.

6. A locking device for a lockable unit having a rotatable wheel, comprising
   an elongate locking member having a turnably journalled end and a swingable free end, said locking member being swingable about an axis transverse to the axis of the wheel from a releasing position free of the wheel through the wheel to a locking position, and vice-versa;
   a catch receiving said free end in the locking position of said locking member;
   a locking mechanism attached to said journalled end for turning said locking member about a longitudinal axis; and
   means cooperating with said locking mechanism to control the turning of said locking member about said longitudinal axis for moving said free end into said catch and for removing it therefrom, said means including a locking member positioning means for positioning said locking member in a first position to permit swinging movement thereof and positioning said locking member in a second position to prevent swinging movement thereof.

7. The locking device as claimed in claim 6, in which the lockable unit has a pair of frame legs with the wheel being rotatably connected therebetween, said locking member being swingably connected with one of said legs and said catch being connected with the other of said legs, whereby the wheel is locked against rotation relative to the legs.

8. The locking device as claimed in claim 6, wherein:
   said cooperating means includes a stub shaft operatively associated with said locking member and closely located thereto, said stub shaft having a first recess,
   said locking member positioning means includes a second recess on said locking member movable from a first position with said locking member whereby swinging movement thereof is prevented to a second position facing said stub shaft upon turning of said locking member about said longitudinal axis whereby the swinging movement of the locking member between its locking and releasing positions takes part on said stub shaft and said first and said second recesses determine in which turning position said locking member is swingable and/or in which swinging position said locking member is turnable.

9. The locking device as claimed in claim 6, including:
   a spring coupled with and loading said locking member for urging it to turn into a position preventing its swinging movement.

10. The locking device as claimed in claim 6, including:
    a key and cylinder lock for said locking mechanism, said key being removable from said cylinder lock only in a certain zero position of the lock,
    said locking member positioning means including members positively guided so that said zero position of said cylinder lock can be obtained only when said locking member is in its locking position.

11. The locking device as claimed in claim 10, in which said cylinder lock includes tumblers arranged to take a position releasing the locking mechanism of said cylinder lock only after turning the key of the lock from its insertion and removal position.

12. The locking device as claimed in claim 11, including:
    a spring coupled with said locking member for urging thereof to turn into a position preventing the swinging thereof; and
    a stop surface on said stub shaft cooperating with said second recess to prevent said locking member when in its releasing position from turning into a position permitting removal of the key.

13. The locking device as claimed in claim 9, wherein said stub shaft includes a stop surface which cooperates with said second recess to prevent said locking member from moving from its releasing position.

14. The locking device as claimed in claim 13, including:
    a swingable body, and
    means coupling said swingable body to said stub shaft for pivotal movement thereabout.

15. The locking device as claimed in claim 6, including:
    a spring coupled with said locking member for urging thereof to turn into a position preventing swinging thereof,
    said locking member positioning means including stop surfaces to prevent said locking member in its releasing position from swinging towards its locking position.

* * * * *

UNITED STATES PATENT AND TRADEMARK OFFICE
CERTIFICATE OF CORRECTION

PATENT NO. : 4,180,998
DATED : January 1, 1980
INVENTOR(S) : Erkki Hellman

It is certified that error appears in the above-identified patent and that said Letters Patent are hereby corrected as shown below:

Column 3, line 1     delete comma after "prevented"

line 2     insert comma after "position"

Signed and Sealed this

First Day of July 1980

[SEAL]

*Attest:*

SIDNEY A. DIAMOND

*Attesting Officer*     *Commissioner of Patents and Trademarks*